Figure 2:
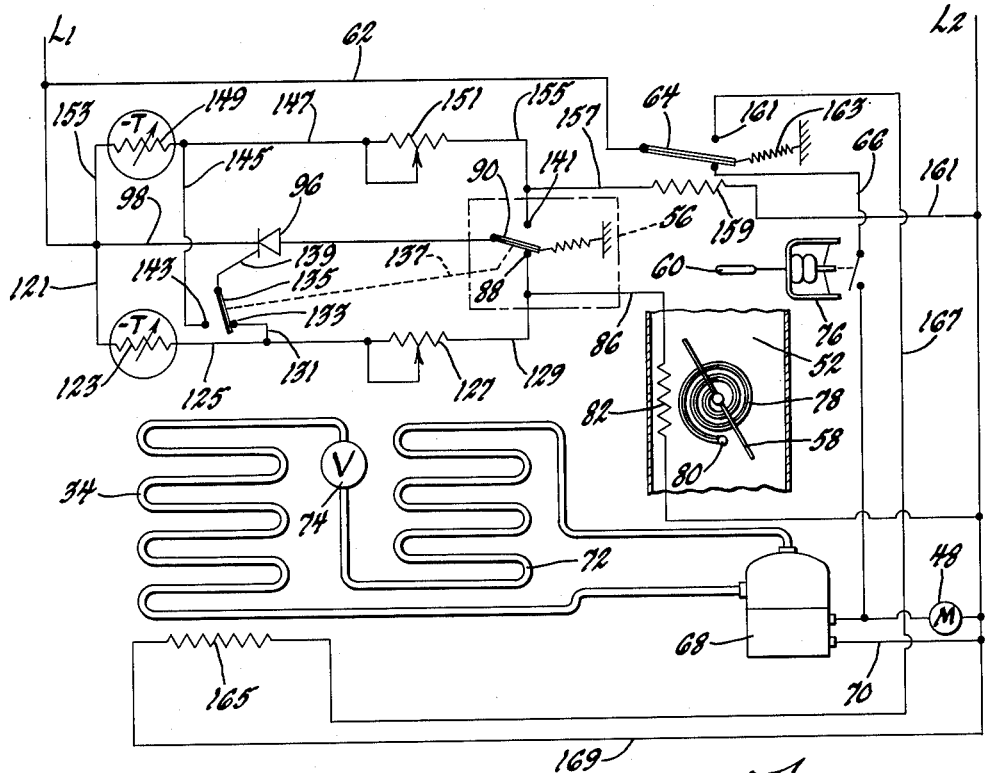

Aug. 31, 1965  E. C. ARMENTROUT ETAL  3,203,195

REFRIGERATING APPARATUS

Filed May 27, 1963

INVENTORS
Everett C. Armentrout
Fred L. Pansing
BY Carl A. Stickel
THEIR ATTORNEY 3,203,195
REFRIGERATING APPARATUS
Everett C. Armentrout, New Carlisle, and Fred L. Pansing, Brookville, Ohio, assignors to General Motors Corporation, Detroit, Mich., a corporation of Delaware
Filed May 27, 1963, Ser. No. 283,290
8 Claims. (Cl. 62—156)

This invention pertains to refrigerating apparatus and more particularly to a simple, reliable control system for a two compartment refrigerator which includes a semiconductor element.

The problem of initiating a defrost cycle for the evaporator in the refrigerator system has always been difficult. Defrost systems which operate at timed intervals must be set for the worst forseeable frost conditions and therefore normally provide defrost periods much more frequently than necessary. Many defrost systems have been proposed which are responsive to the thickness of frost but all apparently have encountered difficulty.

It is an object of this invention to provide a reliable defrosting system for refrigerators which includes a semiconductor element to improve its reliability.

It is another object of this invention to provide a reliable defrosting system for refrigerators which employs a semi-conductor element and which will defrost the evaporator only when the frost has reached an objectionable amount.

It is another object of this invention to provide an improved control system which will control the temperature of a food compartment through the use of a semiconductor element.

These and other objects are obtained in the form shown in the drawings in which a voltage dividing circuit including a thermistor mounted in the food compartment and an adjustable resistance controls the voltage applied to the gate of a silicon controlled rectifier so as to control an electrically controlled damper which controls the delivery of cold air into the compartment. When the cold air delivered to the food compartment rises to a predetermined temperature a temperature responsive switch disconnects the silicon controlled rectifier from its control of the damper and connects the silicon controlled rectifier in controlling relation to a relay which may be effective to initiate a defrost cycle. The temperature control responsive to the temperature of the air delivered to the food compartment also operates a switch which connects the cathode and the gate of the silicon controlled rectifier across the terminals of a thermistor which is mounted in heat transfer relation with the evaporator.

This thermistor is located in a voltage divider circuit which also includes an adjustable resistance which will adjust the temperature at which the thermistor causes the silicon controlled rectifier to conduct. When, as a result of an objectionable thick accumulation of frost thereon, the evaporator is sufficiently cold to increase the resistance of the thermistor sufficiently, the silicon controlled rectifier will conduct and operate the relay to the defrost position. The defrost period will continue until the temperature of the evaporator and the thermistor is raised sufficiently to cause defrosting and the voltage drop across the thermistor becomes low enough to stop the silicon controlled rectifier from conducting. This returns the system to normal operation and the resumed flow of cold air in the passage to the food compartment will restore the control responsive to it to the normal position to provide for normal refrigeration.

Further objects and advantages of the present invention will be apparent from the following description, reference being had to the accompanying drawings, wherein a preferred embodiment of the present invention is clearly shown.

Figure 1:
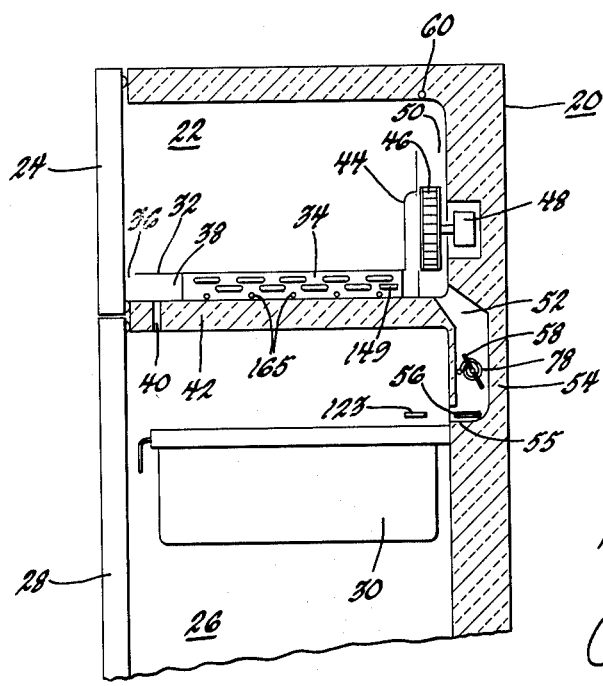

In the drawings:
FIGURE 1 is a vertical sectional view through a two compartment frost free type refrigerator embodying one form of my invention; and
FIGURE 2 is a wiring diagram and diagrammatic refrigeration system for the refrigerator shown in FIGURE 1.

Referring now to the drawings, and particularly to FIGURE 1, there is shown an insulated refrigerator cabinet 20 having an upper below-freezing compartment 22 closed by the upper door 24 and a lower above-freezing compartment 26 closed by a lower door 28 and provided with a meat keeping container 30. Beneath the false sheet metal bottom wall 32 of the below freezing compartment 22 is an evaporator compartment 38 containing a fin and tube type refrigerant evaporator 34 having spaced parallel vertical fins extending from front to rear. At the front of false bottom wall 32 there is provided an entrance 36 to the evaporator compartment 38 beneath the wall 32. A second entrance 40 is provided through the insulated wall 42 beneath the evaporator compartment 38 which extends from the above freezing compartment 26 into the evaporator compartment 38 in front of the evaporator 34.

At the rear behind the evaporator 34 the evaporator compartment 38 connects to a shroud 44 for conducting the air to the inlet of a centrifugal fan 46 driven by an electric motor 48. This fan 46 has an upwardly extending outlet 50 for discharging some of the air into the below freezing compartment 22 and a downwardly extending outlet 52 extending through the insulated wall 54 to an outlet 55 discharging into the above freezing compartment 28 over the meat keeping container 30. To prevent the compartment 26 from becoming too cold the outlet 52 is provided with a bimetal operated damper 58. At the top of the below freezing compartment 22 above the outlet 50 there is provided a thermostat bulb 60 for controlling the refrigerating system.

Referring now particularly to FIGURE 2, the supply conductor L1 connects through the conductor 62 to the double throw snap acting bimetal switch 64 which normally connects through the conductor 66 to the sealed motor compressor unit 68 which also connects through the conductor 70 to the second supply conductor L2. The fan motor 48 is connected in parallel with the sealed unit 68. The sealed unit 68 withdraws evaporated refrigerant from the evaporator 34 and forwards the compressed refrigerant to a condenser 72 from which the liquid refrigerant is conducted under the control of a suitable valve or restrictor 74 to the evaporator 34. Connected in series with the conductor 66 is a thermostatically controlled snap acting switch 76 controlled by the thermostat bulb 60 in response to the temperature of the below freezing compartment 22.

The damper 58 is connected to and operated by one end of a coiled bimetal strip 78 having its other end connected to the anchorage 80. This bimetal strip 78 has its high expanding side on its inner face so that when its temperature is increased, it will move the damper 58 toward the closed position. The cathode of the semiconductor control device or means, specifically a silicon controlled rectifier 96, is connected by the conductor 98 to the supply conductor L1. The supply conductor L1 also connects through conductor 121 to one terminal of a thermistor 123. This thermistor 123 which is a form of temperature responsive resistance is located in the above freezing storage compartment 26 as shown in FIGURE 1. If desired it may be located near the passage 40. The thermistor 123 has the characteristic of having a rapidly reducing resistance as its temperature rises in the range of temperatures normally maintained in the above freezing food storage compartment 26.

The second terminal of the thermistor 123 is connected through the conductor 125 to an adjustable resistance or potentiometer 127 which in turn connects through the conductor 129 to the conductor 86. This constitutes a form of voltage divider circuit in which the conductor 125 is connected by the conductor 131 to the stationary conatct 133.

A double throw swtich 135 is operatively mechanically connected to the switch 90 so that they operate simultaneously through an operative connection 137 which causes them to move in opposite directions on the diagram of FIGURE 2. The movable contact 135, or switch, is connected to the gate 139 of the rectifier 96. As long as the temperature of the thermistor 123 is below normal, its resistance will be sufficiently high to cause the silicon controlled rectifier to conduct through the application of a voltage differential between the gate 139 and the conductor 98 since the circuit is a form of voltage divider.

When the silicon controlled rectifier 96 conducts it energizes the heater 82 which will operate the bimetal 78 to position the damper 58 closer to its closed position so as to reduce the cooling of the above freezing food storage compartment 26. When the temperature of the food storage compartment 26 and the thermistor 123 rises, the resistance of the thermistor 123 will fall whereby reducing the voltage drop in this parallel circuit so that a lesser voltage differential is applied from the gate 139 and the cathode conductor 98 so as to stop the conduction of the silicon controlled rectifier 96 to substantially reduce the heat of the heater 82 applied to the bimetal 78 so as to cause the damper 58 to move further in the direction of its fully open position so as to provide increased refrigeration for the above freezing food storage compartment 26.

The thermostatic switch 76 operated in accordance with the temperature of the bulb 60 is set to maintain the compartment 22 between the temperatures of +11 and −2 degrees Fahrenheit. This requires the operation of the evaporator 34 at temperatures far below water freezing temperatures causing the accumulation of frost thereon from the circulating air. This gradually reduces the flow of air into the above freezing food compartment 26 and causes a rise in temperature in the discharge duct 52. The double throw switch 56 is set to maintain the position shown in FIGURE 2 until its temperature rises to about 40° F. at which temperature it snaps away from the contact 88 into contact with the upper contact 141. This switch 56 is therefore relied upon to detect the frost build-up upon the evaporator 34 in a sufficient amount to require defrosting.

This operation of the switch 56 also causes the operation of the double throw switch 135 away from its stationary contact 133 into contact with the opposite stationary contact 143. This stationary contact 143 is connected by the conductor 145 to the conductor 147 which connects with the thermistor 149 and the adjustable resistance or potentiometer 151. The other terminal of the thermistor 149 is connected by the conductor 153 to the supply conductor L1 while the other terminal of the adjustable resistance 151 is connected by the conductor 155 to the stationary contact 141. The conductor 155 is also connected through the conductor 157 to the thermal relay heater 159 having its second terminal connected through the conductor 161 to the second supply conductor L2.

The circuit between the conductors 153 and 161 constitutes a form of voltage divider in which the voltage across the thermistor 149 varies according to its temperature. When the switch 135 is in contact with the stationary contact 143 the thermistor 149 is connected between the gate 139 and the cathode conductor 98 of the silicon controlled rectifier 96. The thermistor 149 is located on one of the fins of the evaporator 34 so that when the evaporator 34 is excessively coated with frost its temperature will be quite low. At such a low temperature the resistance of the thermistor 149 will be high thereby impressing a voltage across the gate 139 and the cathode conductor 98 sufficient to cause the silicon controlled rectifier 96 to conduct and pass a current through the switch 56 to the heater 159 which will heat the bimetal relay switch 64 and cause it to move to its upper position in contact with the stationary contact 161.

The bimetal relay switch 64 is provided with a toggle spring 163. The engagement of the bimetal switch 64 with the contact 161 will energize the defrost heater 165 through the conductor 62, the bimetal switch 64, the contact 161, the conductor 167, and through the conductor 169 to the supply conductor L2. The defrost heater 165 will rapidly heat the evaporator 34 and melt the frost therefrom. When the thermistor 149 reaches a sufficiently high temperature such as 50° F., for example, to assure the complete defrosting of the evaporator 34, its resistance will be sufficiently low to reduce the voltage across it sufficiently to stop the conducting of the silicon controlled rectifier 96. When the silicon controlled rectifier 96 stops conducting the heater 159 will be effectively deenergized. The bimetal switch 64 will then cool and return to its original position in contact with the conductor 66 to resume the operation of the refrigerating system and particularly the operation of the sealed motor compressor unit 68 and the fan motor 48 through the closed switch 76. The flow of cold air through the outlet 52 will cause the return of the switches 56 and 135 to their original positions.

If the switch 56 should move to its upper defrost position into contact with the upper contact 141 and there is little frost upon the evaporator 34, the defrost cycle will not take place. The thermistor 149 will not be covered with frost and will be somewhat heated by the air flowing through the evaporator compartment 38 so that it will remain at the comparatively high temperature. At this temperature the thermistor 149 will more readily conduct and therefore the voltage across it which is applied across the gate 139 and the cathode conductor 98 will be sufficiently low as to prevent the silicon controlled rectifier 96 from conducting. This will prevent the substantial energization of the thermal relay of the heater 159 and will prevent the bimetal switch 64 from moving out of the refrigerating system into the defrosting position. This therefore prevents the system from going into the defrost period when the food compartment door 28 is left open for a substantial period of time or an unusual large quantity of warm food is placed in the compartment 26. The system therefore employs the silicon controlled rectifier 96 not only for controlling the defrost period but also for controlling the positioning of the damper 58 during normal refrigeration.

While the embodiment of the invention as herein disclosed constitutes a preferred form, it is to be understood that other forms might be adopted.

What is claimed is as follows:

1. Refrigerating apparatus including insulated walls enclosing below and above freezing storage compartments separated from each other, means forming an evaporator compartment having inlet and outlet passage means connecting with said below and above freezing compartments, an evaporator associated with said evaporator compartment, a temperature responsive resistance responsive to the temperature in said above freezing compartment, electrically controlled means for controlling the flow of air between said evaporator compartment and said above freezing compartment, a semiconductor control means connected in controlling relationship with said electrically controlled means, said temperature responsive resistance being connected in controlling relationship with said semiconductor control means.

2. Refrigerating apparatus including insulated walls enclosing below and above freezing storage compartments separated from each other, means forming an evaporator compartment having inlet and outlet passage means connecting with said below and above freezing compartments, an evaporator associated with said evaporator compartment, a temperature responsive resistance responsive to the temperature in said above freezing compartment, electrical supply conductors, electrically controlled means for controlling the flow of air between said evaporator compartment and said above freezing compartment, a silicon controlled rectifier effectively connected in series with said electrically controlled means across said supply conductors, said silicon controlled rectifier having a cathode and a gate, said temperature responsive resistance being connected between the cathode and the gate of said silicon controlled rectifier.

3. Refrigerating apparatus including insulated walls enclosing below and above freezing storage compartments separated from each other, means forming an evaporator compartment having inlet and outlet passage means connecting with said below and above freezing compartments, an evaporator associated with said evaporator compartment, electrical supply conductors, electrically controlled means for controlling the flow of air between said evaporator compartment and said above freezing compartment, a temperature responsive resistance responsive to the temperature in said above freezing compartment, a silicon controlled rectifier effectively connected in series with said electrically controlled means across said supply conductors, said silicon controlled rectifier having a cathode and an anode and a gate, said temperature responsive resistance being connected between the cathode and the gate of said silicon controlled rectifier, and a resistance connected across said gate and said anode of said rectifier.

4. Refrigerating apparatus including insulated walls enclosing below and above freezing storage compartments separated from each other, means forming an evaporator compartment having inlet and outlet passage means connected with said below and above freezing compartments, an evaporator associated with said evaporator compartment, a first temperature responsive resistance responsive to the temperature in said above freezing compartment, a second temperature responsive resistance responsive to the temperature to said evaporator, first control means for controlling the temperature of one of said compartments, a semiconductor device for controlling said first control means, and second control means responsive to the temperature of the air flowing from said evaporator compartment to one of said storage compartments for alternatively connecting said first and second temperature responsive resistances in controlling relationship with said semiconductor device.

5. Refrigerating apparatus including insulated walls enclosing below and above freezing storage compartments separated from each other, means forming an evaporator compartment having inlet and outlet passage means connecting with said below and above freezing compartments, an evaporator associated with said evaporator compartment, a first temperature responsive resistance responsive to the temperature in said above freezing compartment, a second temperature responsive resistance responsive to temperature of said evaporator, first control means for controlling the temperature of one of said compartments, a semiconductor device for controlling said first control means, and second control means responsive to the temperature of the air flowing from said evaporator compartment to one of said storage compartments for alternatively connecting said first and second temperature responsive resistances in controlling relationship with said semiconductor device, an electrically operated refrigerant liquefying means operatively connected to said evaporator, an electrically controlled defrosting means for defrosting said evaporator, said second control means including means for alternately rendering effective said liquefying means and said defrosting means.

6. Refrigerating apparatus including insulated walls enclosing below and above freezing storage compartments separated from each other, means forming an evaporator compartment having inlet and outlet passage means connecting with said below and above freezing compartments, an evaporator associated with said evaporator compartment, a first temperature responsive resistance responsive to the temperature in said above freezing compartment, means controlled by said first temperature responsive resistance for controlling the cooling of said above freezing storage compartment, defrost means responsive to the temperature of the air flowing from said evaporator compartment to said above freezing compartment for defrosting said evaporator, and means including a second temperature responsive resistance responsive to the temperature of said evaporator for preventing the operation of said defrost means.

7. Refrigerating apparatus including insulated walls enclosing below and above freezing storage compartments separated from each other, means forming an evaporator compartment having inlet and outlet passage means connecting with said below and above freezing compartments, an evaporator associated with said evaporator compartment, refrigerant liquefying means operatively connected to said evaporator, defrosting means for defrosting said evaporator, defrost control means having a normal position and a defrost position responsive to the temperature of the air flowing from said evaporator compartment to one of said storage compartments for rendering effective said defrosting means, means responsive to the temperature of said evaporator for discontinuing the operation of said defrosting means and resuming operation of said liquefying means, said defrost control means including means effective for its restoration to normal position responsive to the flow of cold air from said evaporator compartment to one of said storage compartments.

8. Refrigerating apparatus including insulated walls enclosing below and above freezing storage compartments separated from each other, means forming an evaporator compartment having inlet and outlet passage means connecting with said below and above freezing compartments, an evaporator associated with said evaporator compartment, refrigerant liquefying means operatively connected to said evaporator, defrosting means for defrosting said evaporator, and means responsive to the temperature of the air flowing from said evaporator compartment to one of said storage compartments for rendering effective said defrosting means, and means responsive to the temperature of said evaporator for preventing the operation of the defrosting means.

References Cited by the Examiner

UNITED STATES PATENTS

| | | | |
|---|---|---|---|
| 2,474,441 | 6/49 | Sparrow | 62—186 |
| 2,907,180 | 10/59 | Mann | 62—155 |
| 2,997,857 | 8/61 | Clark | 62—187 |
| 3,010,288 | 11/61 | Jacobs | 62—156 |

WILLIAM J. WYE, *Primary Examiner.*

ROBERT A. O'LEARY, *Examiner.*